US011836620B2

(12) United States Patent
Xu et al.

(10) Patent No.: US 11,836,620 B2
(45) Date of Patent: *Dec. 5, 2023

(54) META-GRADIENT UPDATES FOR TRAINING RETURN FUNCTIONS FOR REINFORCEMENT LEARNING SYSTEMS

(71) Applicant: DeepMind Technologies Limited, London (GB)

(72) Inventors: Zhongwen Xu, London (GB); Hado Philip van Hasselt, London (GB); David Silver, Hitchin (GB)

(73) Assignee: DeepMind Technologies Limited, London (GB)

( * ) Notice: Subject to any disclaimer, the term of this patent is extended or adjusted under 35 U.S.C. 154(b) by 442 days.

This patent is subject to a terminal disclaimer.

(21) Appl. No.: 17/112,220

(22) Filed: Dec. 4, 2020

(65) Prior Publication Data
US 2021/0089915 A1 Mar. 25, 2021

Related U.S. Application Data

(63) Continuation of application No. 16/417,536, filed on May 20, 2019, now Pat. No. 10,860,926.

(60) Provisional application No. 62/673,844, filed on May 18, 2018.

(51) Int. Cl.
*G06N 3/08* (2023.01)
(52) U.S. Cl.
CPC ..................................... *G06N 3/08* (2013.01)
(58) Field of Classification Search
USPC .......................................................... 706/12
See application file for complete search history.

(56) References Cited

U.S. PATENT DOCUMENTS

2019/0272467 A1* 9/2019 Kearney .................. G06N 3/08
2019/0354859 A1 11/2019 Xu

OTHER PUBLICATIONS

Al-Shedivat et al ("Continuous Adaptation Via Meta-Learning in Nonstationary and Competitive Environments") (Year: 2008).*
Schweighofer et al. ("Meta-learning in Reinforcement Learning" 2003) (Year: 2003).*
PCT International Preliminary Report on Patentability in International Appln. No. PCT/EP2019/062936, dated Nov. 24, 2020, 7 pages.

(Continued)

*Primary Examiner* — Lut Wong
(74) *Attorney, Agent, or Firm* — Fish & Richardson P.C.

(57) ABSTRACT

Methods, systems, and apparatus, including computer programs encoded on a computer storage medium, for reinforcement learning. The embodiments described herein apply meta-learning (and in particular, meta-gradient reinforcement learning) to learn an optimum return function G so that the training of the system is improved. This provides a more effective and efficient means of training a reinforcement learning system as the system is able to converge on an optimum set of one or more policy parameters θ more quickly by training the return function G as it goes. In particular, the return function G is made dependent on the one or more policy parameters θ and a meta-objective function J' is used that is differentiated with respect to the one or more return parameters η to improve the training of the return function G.

20 Claims, 4 Drawing Sheets

(56) References Cited

OTHER PUBLICATIONS

Abadi et al., "TensorFlow: A system for large-scale machine learning," OSDI, 2016, 16:21 pages.
Al-Shedivat et al., "Continuous adaptation via meta-learning in nonstationary and competitive environments," arXiv, Feb. 2018, 21 pages.
Andrychowicz et al., "Learning to learn by gradient descent by gradient descent," arXiv, Nov. 2016, 17 pages.
Bellemare et al., "A distributional perspective on reinforcement learning," arXiv, Jul. 2017, 19 pages.
Bellemare et al., "The arcade learning environment," An evaluation platform for general agents arXiv, Jun. 2013, 27 pages.
Bertsekas et al., "Neuro-Dynamic Programming." Nested Partitions Optimization, 1996, 157 pages.
Downey et al., "Temporal difference bayesian model averaging: A bayesian perspective on adapting lambda," Proceedings of the 27th International Conference on Machine Learning, 2010, 8 pages.
Duan et al., "RL2: Fast reinforcement learning via slow reinforcement learning," arXiv, Nov. 2016, 14 pages.
Elfwing et al., "Online meta-learning by parallel algorithm competition," arXiv, Feb. 2017, 15 pages.
Espenholt et al., "IMPALA: Scalable distributed Deep-PL with importance weighted actor-learner architectures," arXiv, Jun. 2018, 22 pages.
Finn et al., "Meta-learning and universality: Deep representations and gradient descent can approximate any learning algorithm," arXiv, Feb. 2018, 20 pages.
Finn et al., "Model-agnostic meta-learning for fast adaptation of deep networks," arXiv, Jul. 2017, 13 pages.
Finn et al., "One-shot visual imitation learning via meta-learning," arXiv, Sep. 2017, 12 pages.
Fortunato et al., "Noisy networks for exploration," arXiv, Jul. 2019, 21 pages.
Franceschi et al., "Forward and reverse gradient-based hyperparameter optimization," arXiv, Dec. 2017, 11 pages.
Grant et al., "Recasting gradient-based meta-learning as hierarchical Bayes," arXiv, Jan. 2018, 13 pages.
Harutyunyan et al., "Q($\lambda$) with off-policy corrections," arXiv, Aug. 2016, 15 pages.
He et al., "Deep residual learning for image recognition," arXiv, Dec. 2015, 12 pages.
Hessel et al., "Rainbow: Combining improvements in deep reinforcement learning," arXiv, Oct. 2017, 14 pages.
Hochreiter et al., "Learning to learn using gradient descent" ICANN, 2001, 8 pages.
Hochreiter et al., "Long short-term memory," Neural computation, 1997, 32 pages.
Jaderberg et al., "Population based training of neural network," arXiv, Nov. 2017, 21 pages.
Jaderberg et al., "Reinforcement learning with unsupervised auxiliary tasks," arXiv, Nov. 2016, 14 pages.
Kearns et al., "Bias-variance error bounds for temporal difference updates," COLT, 2000, 7 pages.
Kingma et al., "ADAM: A method for stochastic optimization," arXiv, Jan. 2017, 15 pages.
Konidaris et al., "Re-evaluating complex backups in temporal difference learning," NIPS, 2011, 9 pages.
Maclaurin et al., "Gradient-based hyperparameter optimization through reversible learning," arXiv, Apr. 2015, 10 pages.
Mahmood., "Off-policy Reinforcement Learning Algorithms," Thesis for the defree of Doctor of Philisophy, University of Alberta, 2017, 189 pages.
Mnih et al., "Asynchronous Methods for Deep Reinforcement Learning," arXiv, Feb. 4, 2016, 19 pages.
Mnih et al., "Human-level control through deep reinforcement learning" Nature, 2015, 13 pages.
Mnih et al., "Playing atari with deep reinforcement learning" NIPS workshop, 2013, 9 pages.

Munos et al, "Safe and efficient off-policy reinforcement learning," arXiv, Nov. 2016, 18 pages.
Nair et al., "Massively parallel method for deep reinforcement learning," arXiv, Jul. 2015, 14 pages.
PCT International Search Report and Written Opinion in International Appln. No. PCT/EP2019/062936, dated Sep. 3, 2019, 12 pages.
Pedregosa., "Hyperparameter optimization with approximate gradient," arXiv, Jun. 2016, 15 pages.
Precup et al., "Eligibility traces for off-policy policy evaluation," ICML, 2000, 9 pages.
Prokhorov et al., "Adaptive critic designs," IEEE Transactions on Neural Networks, Sep. 1997, 37 pages.
Randlov et al., "Learning to drive a bicycle using reinforcement learning and shaping," ICML, 1998, 9 pages.
Rummery et al., "On-line Q-learning using connectionist systems," Technical Report, Sep. 1994, 21 pages.
Schaul et al., "Prioritized experience replay," arXiv, Feb. 2016, 21 pages.
Schaul et al., "Universal value function approximators," ICML, 2015, 9 pages.
Schmidhuber, "Evolutionary principles in self-referential learning," Thesis of the degree of Doctor of Philosophy, Technische Universitat Muchen, May 1987, 64 pages.
Schraudolph, "Local gain adaptation in stochastic gradient descent," ICANN, 1999, 7 pages.
Schweighofer et al., "Meta-learning in Reinforcement Learning," Neural Networks, Jan. 2003, 16(1):5-9.
Singh et al., "Analytical mean squared error curves for temporal difference learning," Kluwer Academic Publishers, 1998, 38 pages.
Singh et al., "Intrinsically motivated reinforcement learning," NIPS, 2005, 8 pages.
Snoek et al., "Practical Bayesian optimization of machine learning algorithms," NIPS, 2012, 9 pages.
Sutton et al., "A new Q($\lambda$) with interim forward view and Monte Carlo equivalence," ICML, 2014, 9 pages.
Sutton et al., "An emphatic approach to the problem of off-policy temporal-difference learning," Journal of Machine Learning Research, May 2016, 29 pages.
Sutton et al., "Reinforcement learning: An introduction," MIT press Cambridge, 2018, 398 pages.
Sutton, "Adapting bias by gradient descent: An incremental version of delta-bar-delta," AAAI Proceedings, 1992, 6 pages.
Sutton, "Learning to predict by the methods of temporal differences," Machine Learning, 1988, 37 page.
Tieleman et al., [online] "Lecture 6.5-RMSProp: Divide the gradient by a running average of its recent magnitude," Dec. 8, 2016, <https://www.youtube.com/watch?v=SJ48OZ_qlrc>, 1 page [Video Submission].
Van Hasselt, "Deep reinforcement learning with double Q-learning," arXiv, Dec. 2015, 13 pages.
Van Hasselt, "Double Q-learning," NIPS, 2010, 9 pages.
Van Seijen et al, "A theoretical and empirical analysis of Expected Sarsa," IEEE Symposium on Adaptive Dynamic Programming and Reinforcement Learning, 2009, 8 pages.
Wang et al., "Dueling network architectures for deep reinforcement learning," arXiv, Apr. 2016, 15 pages.
Wang et al., "Learning to reinforcement learn," arXiv, Jan. 2017, 17 pages.
White et al., "A greedy approach to adapting the trace parameter for temporal difference learning," Proceedings of the 15th International Conference on Autonomous Agents and Multiagent Systems, May 2016, 11 pages.
Wichrowska et al., "Learned optimizers that scale and generalize," arXiv, Sep. 2017, 11 pages.
Williams et al., "A learning algorithm for continually running fully recurrent neural networks," A Learning Algorithm for Continually Running Fully Recurrent Neural Networks, 1989, 11 pages.
Williams, "Simple statistical gradient-following algorithms for connectionist reinforcement learning," Machine Learning, 1992, 27 pages.

(56) References Cited

OTHER PUBLICATIONS

Young et al., "Metatrace: Online Step-size Tuning by Meta-gradient Descent for Reinforcement Learning Control," arXiv, May 10, 2018, 27 pages.
Zheng et al., "On learning intrinsic rewards for policy gradient methods," arXiv, Jun. 2018, 15 pages.
Office Action in European Appln. No. 19727316.2, dated Apr. 14, 2023, 11 pages.
Xu et al., "Meta-Gradient Reinforcement Learning," CoRR, May 24, 2018, arXiv:1805.09801, 17 pages.

* cited by examiner

META-GRADIENT UPDATES FOR TRAINING RETURN FUNCTIONS FOR REINFORCEMENT LEARNING SYSTEMS

CROSS-REFERENCE TO RELATED APPLICATION

This application is a continuation of U.S. application Ser. No. 16/417,536, filed May 20, 2019, which claims priority to U.S. Provisional Application No. 62/673,844, filed on May 18, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

In one innovative aspect the subject matter described in this specification can be embodied in a reinforcement learning system comprising one or more processors configured to retrieve a plurality of experiences from a reinforcement learning neural network configured to control an agent interacting with an environment to perform a task in an attempt to achieve a specified result based on one or more policy parameters for the reinforcement learning neural network, each experience comprising an observation characterizing a state of the environment, an action performed by the agent in response to the observation and a reward received in response to the action. The one or more processors are further configured to update the one or more policy parameters for the reinforcement learning neural network based on a first set of the experiences using a return function that calculates returns based on rewards; and update one or more return parameters of the return function based on the one or more updated policy parameters and a second set of the experiences. The one or more return parameters are updated via a gradient ascent or descent method using a meta-objective function differentiated with respect to the one or more return parameters, wherein the meta-objective function is dependent on the one or more policy parameters.

The embodiments described herein apply meta-learning (and in particular, meta-gradient reinforcement learning) to learn an optimum return function G so that the training of the system is improved. This provides a more effective and efficient means of training a reinforcement learning system as the system is able to converge on an optimum set of one or more policy parameters $\theta$ more quickly by training the return function G as it goes. In particular, the return function G is made dependent on the one or more policy parameters $\theta$ and a meta-objective function J' is used that is differentiated with respect to the one or more return parameters $\eta$ to improve the training of the return function G.

Meta-learning can be considered the act of training a system to learn more effectively. The meta-objective J' can therefore be considered an objective to improve learning functionality of the reinforcement learning neural network. Specifically, the meta-objective function J' may be a function for optimizing the return parameters $\eta$ for the reinforcement learning neural network. The meta-objective function J' may serve the goal of identifying the return function that maximises overall performance in the agent. This may be directly measured by a meta-objective focused exclusively on optimising returns—in other words, a policy gradient objective. For instance, the meta-objective function may calculate the error (e.g., mean-squared error) between the return function and the value function utilised by the agent to determine actions, and the system may be configured to update the return parameters to reduce (e.g., minimise) the error.

Retrieving the experiences r may comprise the system generating the experiences (i.e., the reinforcement learning neural network may form part of the system) or accessing the experiences, e.g., from storage or from an external system. That is, the experiences may be generated online by the reinforcement learning system itself or may be obtained from an external reinforcement learning neural network. Updating the policy parameters $\theta$ could therefore comprise sending the updated policy parameters $\theta'$ to the external reinforcement neural network or updating the reinforcement neural network that forms part of the overall system.

A variety of different types of return function G may be utilised based on a variety of different types of reinforcement learning. For instance, the return function G may be a return function in a stochastic gradient ascent method or could act as a target in a Q-learning method.

The first and second sets of experiences may be the same. Alternatively, the first and second sets of experiences may comprise different experiences. Using different experiences for updating the one or more return parameters to those used for updating the one or more policy parameters (holding back training data for use in training the return function) improves the training by avoiding overfitting.

Updating the one or more return parameters may utilize a differential of the one or more updated policy parameters with respect to the one or more return parameters. The differential of the meta-objective function J' with respect to the one or more return parameters η may make use of partial derivatives, breaking the differential into two components, the first component being a differential of the meta-objective function J' with respect to the one or more updated policy parameters θ', and the second component being a differential of the one or more updated policy parameters θ' with respect to the one or more return parameters η. This therefore allows the system to make use of the updated (improved) policy parameters θ' when updating the one or more return parameters η and thereby improves the effectiveness of the training.

The one or more policy parameters may be one or more parameters that define the functioning of the reinforcement learning neural network (one or more parameters that define the actions taken by the neural network). The one or more return parameters may be parameters that define how returns are determined based on the rewards.

The one or more processors may be further configured to iteratively: retrieve updated experiences generated by the reinforcement neural network using the one or more updated policy parameters and the one or more updated return parameters; further update the one or more policy parameters based on a first set of the updated experiences using the one or more updated return parameters; and further update the one or more return parameters based on the further updated policy parameters and a second set of the updated experiences via the gradient ascent or descent method, until an end condition is reached.

Accordingly, the system may iteratively update the one or more policy parameters and the one or more return parameters to converge on an optimal policy. By updating the one or more return parameters during the training of the one or more policy parameters, the system is able to improve the calculated returns and can therefore train the policy more accurately and using fewer training episodes (more efficiently).

The one or more return parameters may be updated each time that the policy parameters are updated. This provides a computationally simpler and more efficient mechanism for training the system.

Alternatively, the one or more return parameters may be kept fixed over a number of updates of the one or more policy parameters. In this case, the one or more return parameters may then be updated through backpropagation through time.

Updating the one or more return parameters may comprise applying a further return function as part of the meta-objective function and evaluating the updated policy in terms of the returns from the further return function when applied to the second set of experiences. This may comprise the goal of maximizing the total returns from the further return function with respect to the one or more return parameters. The further return function G' may be a function that calculates returns from rewards based on one or more further return parameters η'. The further return function may be considered a meta-return function with meta-return parameters (or, more generally, meta-parameters). The further return function may act as a means of training the reinforcement learning neural network to improve the return function G.

The further return function may be different to the return function. The further return parameters may be kept fixed during training.

Updating of the one or more policy parameters may apply one or more of a policy and a value function that are conditioned on the one or more return parameters. Conditioning the policy and/or the value function based on the one or more return parameters makes the training method more stable. As the return function changes during training, the policy or value function may become invalid. This may lead to the collapse of the value estimation policy. By conditioning the policy and/or the value function on the one or more return parameters, the agent is enforced to learn universal policies and/or value functions for various sets of return parameters. This allows the method to freely shift the meta-parameters without needing to wait for the approximator to "catch up".

The conditioning may be via an embedding of the one or more return parameters. The embedding may form one or more embedded return parameters by inputting the one or more parameters into an embedding function. The one or more embedded return parameters may represent the one or more parameters using hidden (latent) variables. Specifically, the policy and value function may be conditioned as:

$$V_\theta^\eta(S) = V_\theta([S; e_\eta]) \quad \pi_\theta^\eta(S) = \pi_\theta([S; e_\eta]) \quad e_\eta = w_\eta^T \eta$$

where:

$V_\theta()$ is the value function and $V_\theta^\eta()$ is the conditioned value function;

$\pi_\theta()$ is the policy and $\pi_\theta^\eta()$ is the conditioned policy;

$e_\eta$ is the embedding of the one or more return parameters η;

$[S; e_\eta]$ denotes concatenation of vectors S (the respective state) and $e_\eta$; and $w_\eta$ is the embedding function taking η as input where $w_\eta$ may be learned via backpropagation in the agent training.

The one or more parameters may comprise one or more of a discount factor of the return function and a bootstrapping factor of the return function. The return function may apply the discount factor γ to provide a discounted return. This discounted return may comprise a weighted sum of the rewards, with the discount factor defining the decay of the weighted sum. Optimising the discount factor has been found to be a particularly effective method of improving the efficiency and accuracy of reinforcement learning. Equally, the return function might apply the bootstrapping factor λ to a geometrically weighted combination of returns (a bootstrapping parameter return function, or λ-return). The return function may calculate a weighted combination of returns, with each return being estimated over multiple steps (e.g., being a decaying weighted sum of rewards). Optimising the bootstrapping factor (potentially in combination with the discount factor) leads to more efficient and accurate reinforcement learning.

The one or more processors may be further configured to: update the one or more policy parameters for the reinforcement learning neural network based on the second set of the experiences; and update the one or more return parameters of the return function based on the one or more updated policy parameters and the first set of the experiences, wherein the one or more return parameters are updated via the gradient ascent or descent method. This improves the efficiency and effectiveness of training by repeating the update steps but swapping over the sets of experiences that are used for each update. As mentioned above, using different sets of experiences avoids overfitting. Nevertheless, this reduces the amount of training data that may be used for each update. To improve data efficiency, the first and second sets can be swapped over after the updates, so that the second set experiences can then be used to train the policy and the second set of experiences can then be used to train the return function.

That is, the first set of experiences can be used for updating the one or more policy parameters and the performance of this update can be validated by evaluating the meta-objective function using the second set of experiences. The roles of the first and second sets of experiences can then be swapped so that the second set of experiences are used for updating the one or more policy parameters and the performance of this update can be validated by evaluating the meta-objective function on the first set of experiences. In this way, the proposed method does not require any extra data other than the data used to train the one or more policy parameters in order to conduct the meta learning update to the one or more return parameters.

The differentiated meta-objective function may be:

$$\frac{\partial J'(\tau', \theta', \eta')}{\partial \eta} = \frac{\partial J'(\tau', \theta', \eta')}{\partial \theta'} \frac{d\theta'}{d\eta}$$

where:

η are the one or more return parameters; and

J'(τ', θ', η') is the meta-objective function conditioned on the second set of experiences τ', the one or more updated policy parameters θ' and one or more return parameters η' of a further return function forming part of the meta-objective function.

The above formula is the equivalent of formula (2) described later in this specification.

The system may be configured to calculate the differentiated meta-objective function based on a differential of the updated policy parameters θ' with respect to the return parameters η, dθ'/dη, calculated by adding a differential of an update function with respect to the return parameters, df(τ, θ, η)/dη, the update function being for updating the policy, to a differential of the policy parameters θ with respect to the return parameters η, dθ/dη.

The differential of the updated policy parameters θ' with respect to the return parameters η, dθ'/dη, may be calculated using an accumulative trace to ≈dθ/dη such that:

$$z' = \mu z + \frac{\partial f(\tau, \theta, \eta)}{\partial \eta}$$

where:

μ is a decay parameter; and f(τ, θ, η) is an update function utilised to update the policy.

The differential of the update function with respect to the return parameters, ∂f(τ, θ, η)/∂η, may be calculated via:

$$\frac{\partial f(\tau, \theta, \eta)}{\partial \eta} = \alpha \frac{\partial G_\eta(\tau)}{\partial \eta} \left[ \frac{\partial \log \pi_\theta(A|S)}{\partial \theta} + c \frac{\partial v_\theta(S)}{\partial \theta} \right]$$

where:

α is a learning rate applied when updating the one or more policy parameters from one or more previous policy parameters;

$G_\eta(\tau)$ is the return function that calculates returns from the first set of experiences τ based on the one or more return parameters $\eta_t$;

$\pi_\theta$ is the policy for the reinforcement learning neural network for determining actions Aa from states S, the policy $\pi_\theta$ operating according to the one or more policy parameters θ;

c is a coefficient; and $v_\theta$ (S) is a value function that determines values for states S based on the one or more policy parameters θ.

The above formula is the equivalent of formula (13) described later in this specification.

In other words, the differential of the updated policy parameters with respect to the return parameters may be calculated via:

$$\frac{\partial \theta'}{\partial \eta} = \frac{\partial \theta}{\partial \eta} + \alpha \frac{\partial G_\eta(\tau)}{\partial \eta} \left[ \frac{\partial \log \pi_\theta(A|S)}{\partial \theta} + c \frac{\partial v_\theta(S)}{\partial \theta} \right]$$

The updating of the one or more return parameters may make use of:

$$\frac{\partial J'(\tau', \theta', \eta')}{\partial \theta'} = (G_{\eta'}(\tau') - v_{\theta'}(S')) \frac{\partial \log \pi_\theta(A'|S')}{\partial \theta'}$$

where:

$G_{\eta'}(\tau')$ is the further return function that calculates returns from the second set of experiences τ' based on the one or more further return parameters η';

$\pi_{\theta'}$ is the policy for the reinforcement learning neural network for determining actions A' from states S' taken from the second set of experiences τ', the policy $\pi_{\theta'}$ operating according to the one or more updated policy parameters θ';

$v_{\theta'}$ (S') is a value function that determines values for states S' based on the one or more updated policy parameters θ'.

The above formula is the equivalent of formula (14) described later in this specification.

This evaluates the updated policy in terms of the total returns under η' when measured on the second set of experiences τ'.

The one or more further return parameters may be kept fixed. This allows the gradient with respect to the one or more return parameters to be obtained.

Updating the one or more return parameters may comprises calculating:

$$\eta' = \eta + \beta \frac{\partial J'(\tau'; \theta', \eta')}{\partial \eta}$$

where

η' are the one or more updated return parameters; and

β is a learning factor for updating the one or more return parameters.

The above formula is the equivalent of formulas (2) to (5) described later in this specification.

Accordingly, the updating of the one or more return parameters may apply a gradient ascent method based on the gradient of the meta-objective function with respect to the one or more return parameters.

In one innovative aspect the subject matter described in this specification can be embodied in a computer-implemented method for reinforcement learning. The method comprises: retrieving a plurality of experiences from a reinforcement learning neural network configured to control an agent interacting with an environment to perform a task in an attempt to achieve a specified result based on one or more policy parameters for the reinforcement learning neural network, each experience comprising an observation characterizing a state of the environment, an action performed by the agent in response to the observation and a reward received in response to the action; updating the one or more policy parameters for the reinforcement learning neural network based on a first set of the experiences using a return function that calculates returns based on rewards; and updating one or more return parameters of the return function based on the one or more updated policy parameters and a second set of the experiences, wherein the one or more return parameters are updated via a gradient ascent or descent method using a meta-objective function differentiated with respect to the one or more return parameters, wherein the meta-objective function is dependent on the one or more policy parameters.

A further aspect of the invention may be embodied in one or more computer storage media storing instructions that when executed by one or more computers cause the one or more computers to perform the operations of any of the methods described herein.

Certain novel aspects of the subject matter of this specification are set forth in the claims below.

The subject matter described in this specification can be implemented in particular embodiments so as to realize one or more of the following advantages.

Implementations of the system facilitate improved training of reinforcement learning systems by applying meta-learning to train the reward functions of reinforcement learning systems. The methods described herein utilise a meta-objective function that is dependent on the one or more policy parameters of the system being trained. The meta-objective function is differentiated to obtain a meta-gradient that can be used to adapt the nature of the return, online, whilst interacting and learning from the environment.

More specifically, the update to the return function is applied after the one or more policy parameters have been updated. The gradient of the policy parameters with respect to the one or more return parameters indicates how the meta-parameters affect the policy parameter(s). The method is therefore able to measure the performance of the updated policy parameter(s) on a second sample of experiences to improve the parameter(s) of the return function.

This provides improved performance of the system when trained and allows the system to be trained more efficiently using a smaller amount of training data. For instance, by learning an improved return function as the system trains, the system is able to converge on an optimal set of policy parameters quicker, using fewer updates. As improved rewards are used during training, the final trained system is also displays more accurate and effective learned behaviours.

Implementations of the system may be trained online, on a stream of data, or offline, using stored data, or both. The system can automatically adapt its training to particular training tasks, learning to perform these tasks better. This helps to automate the training process and enables implementations of the system to be used across a wider range of different tasks without necessarily needing to be tuned or adapted to a particular task. The proposed approach is adaptable for use with almost all current reinforcement learning systems, since the return is always utilized in agent updates and almost all current reinforcement learning updates include differentiable functions of the return. This includes, for instance, value-based methods like Q ($\lambda$), policy-gradient methods, or actor-critic algorithms like A3C (Advantage Actor Critic, e.g., Mnih et al. 2016) or IMPALA (Importance-Weighted Actor-Learner), Espholt et al., arXiv: 1802.01561.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
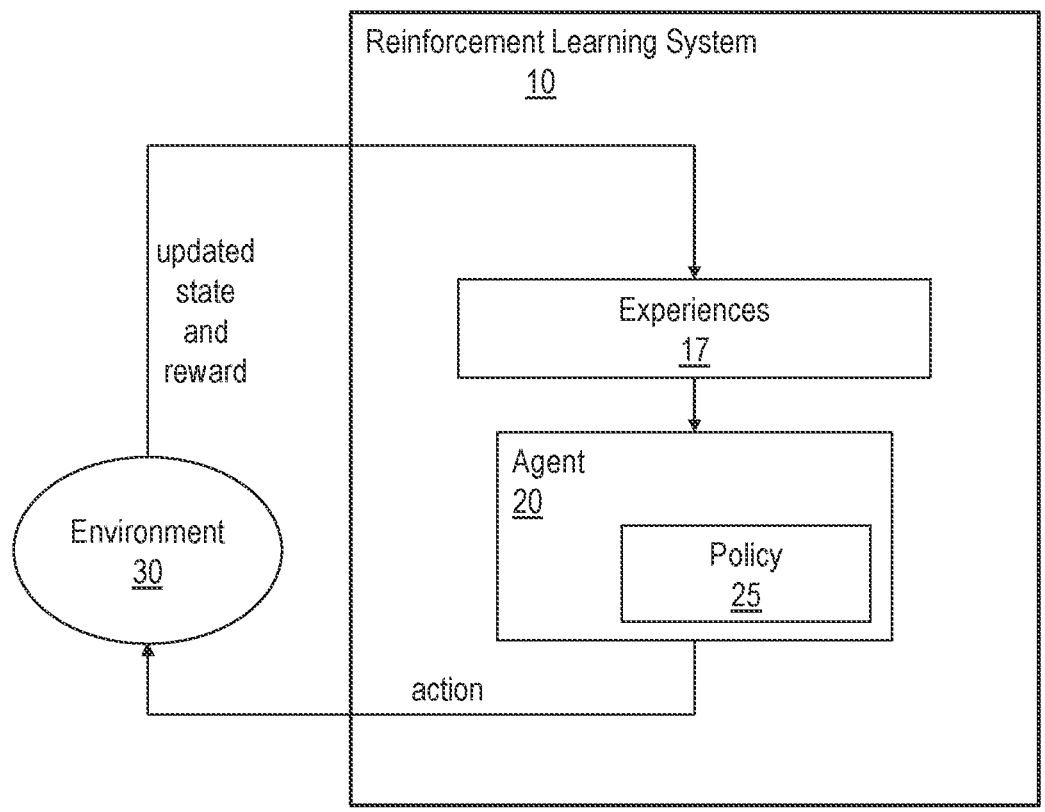
FIG. 1 illustrates an example reinforcement learning system for training an agent to interact with an environment.

The implementations described herein relate to reinforcement learning systems.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation. Optionally the observation at a time step may include data from a previous time step e.g., the action performed at the previous time step, the reward received at the previous time step, and so forth.

In some implementations, the environment is a real-world environment and the agent is an electromechanical agent interacting with the real-world environment. For example, the agent may be a robot or other static or moving machine interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent interacts with the environment, for example sensor data from an image, distance, or position sensor or from an actuator. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. For example in the case of a robot the observations may include data characterizing the current state of the robot, e.g., one or more of joint position, joint velocity, joint force, torque or acceleration, and global or relative pose of a part of the robot such as an arm and/or of an item held by the robot. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or, e.g., motor control data. In other words, the actions can include for example, position, velocity, or force/torque/acceleration data for one or more joints of a robot or parts of another mechanical agent. Action data may include data for these actions and/or electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation, e.g., steering, and movement, e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. A simulated environment can be useful for training a reinforcement learning system before using the system in the real world. In another example, the simulated environment may be a video game and the agent may be a simulated user playing the video game. Generally in the case of a simulated environment the observations may include simulated versions of one or more of the previously described observations or types of observations and the actions may include simulated versions of one or more of the previously described actions or types of actions.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In the case of an electronic agent the observations may include data from one or more sensors monitoring part of a plant or service facility such as current, voltage, power, temperature and other sensors and/or electronic signals representing the functioning of electronic and/or mechanical items of equipment. In some applications the agent may control actions in a real-world environment including items of equipment, for example in a facility such as: a data center, server farm, or grid mains power or water distribution system, or in a manufacturing plant or service facility. The observations may then relate to operation of the plant or facility. For example additionally or alternatively to those described previously they may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. For example the agent may control electrical or other power consumption, or water use, in the facility and/or a temperature of the facility and/or items within the facility. The actions may include actions controlling or imposing operating conditions on items of equipment of the plant/facility, and/or actions that result in changes to settings in the operation of the plant/facility, e.g., to adjust or turn on/off components of the plant/facility.

In some further applications, the environment is a real-world environment and the agent manages distribution of tasks across computing resources, e.g., on a mobile device and/or in a data center. In these implementations, the actions may include assigning tasks to particular computing resources. As further example, the actions may include presenting advertisements, the observations may include advertisement impressions or a click-through count or rate, and the reward may characterize previous selections of items or content taken by one or more users.

The reinforcement learning system may be implemented as one or more computer programs on one or more computers in one or more locations in which the systems, components, and techniques described herein are implemented.

FIG. 1 illustrates an example of a reinforcement learning system. The reinforcement learning system 10 comprises an agent 20 that determines actions based on a policy 25. Each time an action is determined, it is output to an environment 30 being controlled by the agent 20. The action updates a state of the environment 30. The updated state is returned to the reinforcement learning system 10 along with an associated reward for the action. These are used by the reinforcement learning system 10 to determine the next action. In general, the reward is a numerical value. The reward can be based on any event or aspect of the environment 30. For example, the reward may indicate whether the agent 20 has accomplished a task (e.g., navigating to a target location in the environment 30) or the progress of the agent 20 towards accomplishing a task.

The interaction of the agent 20 with the environment 30 over one or more time steps may be represented by a "trajectory" (i.e., sequence) of experience tuples, where each experience tuple corresponds to a respective time step. An experience tuple corresponding to a time step may include: (i) an observation characterizing the state of the environment at the time step, (ii) an action that was selected to be performed by the agent at the time step, (iii) a subsequent observation characterizing a subsequent state of the environment subsequent to the agent performing the selected action, (iv) a reward received subsequent to the agent performing the selected action, and (v) a subsequent action that was selected to be performed at the subsequent time step.

The policy 25 defines how the system performs actions based on the state of the environment. As the system 10 is trained based on a set of experiences 17, the policy 25 followed by the agent 20 is updated by assessing the value of actions according to an approximate value function, or return function to improve the expected return from the actions taken by the policy 25. This is typically achieved by a combination of prediction and control to assess the success of the actions performed by the agent 20, sometimes referred to as the "return". The return is calculated based on the rewards received following a given action. For instance, the return might be an accumulation of multiple reward values over multiple time steps.

Some of the parameters used to define how the system learns are the discount factor $\gamma$ and the bootstrapping parameter $\lambda$. These parameters are discussed in more detail below, with reference to equations (6) and (7).

The discount factor $\gamma$ determines the time-scale of the return. A discount factor close to $\gamma=1$ provides a long-sighted goal that accumulates rewards far into the future, while a discount factor with a value close to $\gamma=0$ provides a short-sighted goal that prioritises short-term rewards. Even in problems where long-sightedness is desired, it is frequently observed that discount factor values of $\gamma<1$ achieve better results, especially during early learning. It is known that many algorithms converge faster with lower discounts factor values, but too low a discount factor value can lead to sub-optimal policies. In practice it can therefore be better to first optimise for a short-sighted horizon, e.g., with $\gamma=0$ at first, and then to repeatedly increase the discount factor value at later stages.

The return may also be bootstrapped to different time horizons. An n-step return accumulates rewards over n time-steps before then adding the value function at the nth time-step. The $\lambda$-return is a geometrically weighted combination of n-step returns. In either case, the parameters n or $\lambda$ may be important to the performance of the algorithm, trading off bias and variance, and therefore an efficient selection of these parameters is desirable.

Figure 2:
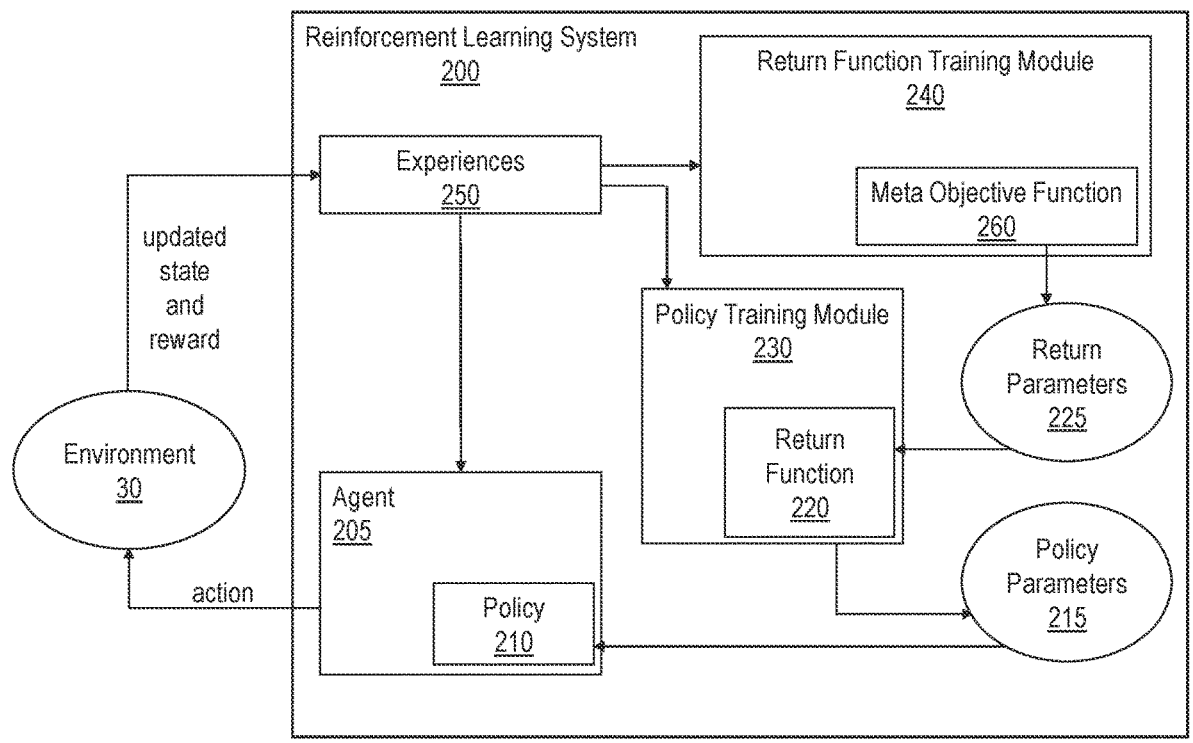
FIG. 2 illustrates a reinforcement learning system applying meta-learning according to the present specification.

FIG. 2 illustrates a reinforcement learning system applying meta-learning according to the present specification. Here, the return function itself is learned, in addition to the policy, by treating it as a parametric function with tuneable meta-return parameters, or meta-parameters, $\eta$. Such meta-parameters $\eta$ may for instance include the discount factor $\gamma$, or the bootstrapping parameter $\lambda$. For the avoidance of doubt, the "meta-return parameters" and "return-parameters" described thus far are equivalent to the "meta-parameters" 7 described hereafter.

The meta-parameters $\eta$ are adjusted during the agent's interaction with the state or environment, allowing the return to both adapt to the specific problem, and also to dynamically adapt over time to the changing context of learning. A practical gradient-based meta-learning method is therefore described herein and it is shown that this can improve performance on large-scale deep reinforcement learning applications.

Returning to FIG. 2, the present reinforcement learning system 200 is similar to that of FIG. 1, in that it comprises an agent 205 that determines actions based on a policy 210 and experiences 250. The policy 210 is defined by policy parameters 215 which may be stored in local memory. The agent 205 may be implemented using a neural network.

The reinforcement learning system 200 also comprises a policy training module 230 and a return function training module 240. The policy training module 230 is configured to update the policy parameters 215 to train the policy 210. The policy parameters 215 are updated based on a return that is calculated based on experiences 250 using a return function 220 that is defined by return parameters 225. The return parameters 225 may be stored in local memory.

The reinforcement learning system 200 also comprises a return function training module 240. The return function training module 240 is configured to update the return parameters 225 based on experiences 250 using a meta-objective function 260. By updating (training) the return function, the system is able to learn a better return function, thereby improving the training of the policy. This allows a more accurate policy to be reached more quickly and more efficiently.

In one embodiment, the return function training module 240 is configured to update the return parameters to reduce the error in the return parameters. This may be relative to the value function that is utilised by the agent 205 to determine an expected return from an action (and thereby determine the action that provides the highest expected return). For instance, the meta-objective function might calculate the mean-squared error between the return and the value for one or more experiences and the return function training module 240 might be configured to update the return parameters to reduce (minimise) this mean-squared error.

As mentioned, the reinforcement learning system 200 comprises a policy 210, the policy 210 comprising one or more policy parameters 215, a return function 220, the return function 220 comprising one or more return parameters 225, and a value function. The system 200 retrieves a plurality of experiences 250 from a reinforcement neural network (where the reinforcement neural network may or may not form a part of the system 200) configured to control an agent interacting with an environment to perform a task in an attempt to achieve a specified result based on the one or more policy parameters 215 for the reinforcement learning neural network.

Each of the plurality of experiences 250 comprises an observation characterizing a state of the environment, an action performed by the agent in response to the observation and a reward received in response to the action.

In some implementations, the system 200 may generate the experiences 250 (i.e., the reinforcement learning neural network may form part of the system 200). Alternatively, the system 200 may access the plurality of experiences 250, e.g., from storage or from an external system. In this latter implementation, as the policy parameters 215 are updated, these may be shared with the neural network to train the neural network.

In the present embodiment, the system 200 is configured such that the plurality of experiences 250 are separated into a first set of experiences, and a second set of experiences, where each of the first and second set of experiences may be used in conjunction with return parameters 225 (also referred to as meta-return parameters or meta parameters) to update policy parameters 215 of the policy 210. This may be achieved, for example, using the policy training module 230. The meta-objective function 260 is then utilised to adjust the return parameters 225. This may be achieved, for example, using the return function training module 240. This process may be repeated a number of times, to iteratively update the policy parameters and the return parameters.

When implemented, a processor may store the agent 205 that receives the experiences 250. The policy training module 230 of the processor may update the policy parameters 215 based on the experiences 250, and this in turn updates the policy 210 carried out by the agent 205. The return function training module 240 of the processor may then adjust the return parameters 225 stored in memory. The updated return parameters may be accessed by the policy training module 230. This therefore iteratively updates the policy 210 and the return function 220.

Figure 3:
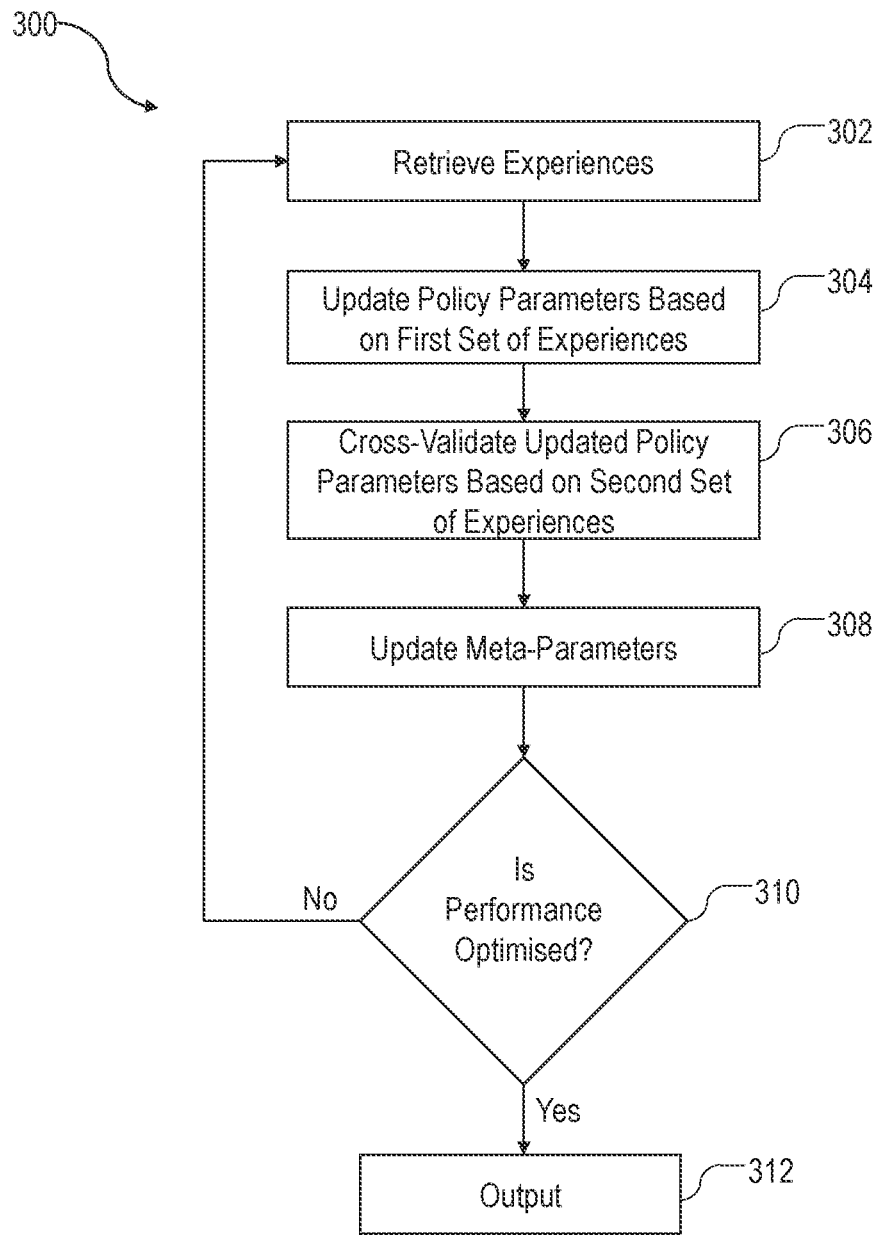
FIG. 3 shows the procedure followed by the system of FIG. 2 for updating policy parameters and meta-parameters based on a retrieved plurality of experiences.

FIG. 3 illustrates the procedure 300 taken by the system 200 in optimising the policy 210 and the return function 220. In step 302, the plurality of experiences 250 are retrieved by the system 200. In some implementations, the system 200 may generate the experiences 250 (i.e., the reinforcement learning neural network 205 may form part of the system 200). Alternatively, the system 200 may retrieve the plurality of experiences from an external system comprising the policy parameters. In this latter scenario, each time the policy parameters 215 are updated, they are sent to the external system for use in generating the next set of experiences. For instance, the plurality of experiences 250 may be generated online by the reinforcement learning system 200 itself or may be obtained from an external reinforcement learning neural network 205.

In step 304, the policy parameters 215 are then updated using an update function 240, and based on the first set of experiences 250a of the plurality of experiences 250, to form updated policy parameters.

In step 306, the updated policy parameters are cross-validated based on the second set of experiences of the plurality of experiences 250, the meta-objective function 260, and the return function 220.

In step 308, return-parameters are updated based on the cross-validation of the updated policy parameters and the meta-objective function 260 to form one or more meta-parameters 225, which then update the update function and the return function 220. In subsequent parameter updates, the existing meta-parameters 225 from the previous update are updated based on the most recent cross-validation.

Then, in step 310, the system determines whether an end criterion has been reached. The end criterion might be a maximum number of iterations or a predetermined performance level. The performance level might be a performance of the policy (e.g., a predefined accumulated reward or return) or the performance of the return function (e.g., error of the return function relative to ground truth returns). If the end criterion has not been reached, the system 200 returns to step 302 for a new iteration for a new parameter update. If the end criterion has been met then the system 200 completes training and outputs a result in step 312.

The output might be an optimised policy (set of policy parameters) or an optimised return function (set of return parameters), as determined in the most recent iteration. The policy can be utilised to implement the trained agent. The return function can be utilised to help train further reinforcement learning agents more efficiently.

As discussed previously, the advantage of updating the policy parameters using a first set of experiences, before cross-validating the updated policy parameters using a second set of experiences is that this avoids overfitting and reduces the amount of training data used for each iterative update.

In more detail, the value function $v_\theta$ (S) and the policy $\pi_\theta$ (A|S) 210 are approximated by a neural network with parameters $\theta$ 215. In order to better approximate the value function and the policy 210, the method includes an update function, $$\theta' = \theta + f(\tau, \theta, \mu) \qquad (1)$$

that adjusts parameters from a sequence of experience $\tau_t = \{S_t, A_t, R_{t+1}, \ldots\}$, where S represents states, A represents actions, R represents rewards, and t represents the number of parameter updates that have been performed. The nature of the update function $f$ is determined by the return parameters, or the meta-parameters $\eta$ 225.

The meta-gradient reinforcement learning approach described in this specification is based on the principle of online cross-validation, using successive samples of experience. The underlying reinforcement learning method is applied to the first set of experiences $\tau$, and its performance is measured using a second set of experiences $\tau'$. Specifically, the method starts with policy parameters $\theta$ 215, and applies the update function to the first set of experiences $\tau$, resulting in new parameters $\theta'$. The gradient $d\theta/d\eta$ of these updates then indicates how the meta-parameters $\eta$ 225 affected these new policy parameters $\theta'$. The method then measures the performance of the new policy parameters $\theta'$ on a subsequent, independent second set of experiences $\tau'$, utilising a differentiable meta-objective $J'(\tau', \theta', \eta')$. When validating the performance on the second set of experiences $\tau'$, a fixed meta-parameter $\eta'$ in J' is used as a reference value. In this way, a differentiable function of the meta-parameters $\eta$ is formed, and the gradient of $\eta$ can be obtained by taking the derivative of meta-objective J' with respect to $\eta$ and applying the chain rule:

$$\frac{\partial J'(\tau', \theta', \eta')}{\partial \eta} = \frac{\partial J'(\tau', \theta', \eta')}{\partial \theta'} \frac{d\theta'}{d\eta} \qquad (2)$$

The parameters form an additive sequence so the gradient of the policy parameter updates $d\theta'/d\eta$ can be expressed as $$\frac{d\theta'}{d\eta} = \frac{d\theta}{d\eta} + \frac{\partial f(\tau, \theta, \eta)}{\partial \eta} + \frac{\partial f(\tau, \theta, \eta)}{\partial \theta}\frac{d\theta}{d\eta} = \qquad (3)$$
$$\left(I + \frac{\partial f(\tau, \theta, \eta)}{\partial \theta}\right)\frac{d\theta}{d\eta} + \frac{\partial f(\tau, \theta, \eta)}{\partial \eta}$$

where I is the identity matrix.

The gradient $\partial f(\tau, \theta, \eta)/\partial \eta$ is large, and can be approximated using an accumulative trace to $z \approx d\theta/d\eta$, such that $$z' = \mu z + \frac{\partial f(\tau, \theta, \eta)}{\partial \eta} \qquad (4)$$

That is, the gradient of the updated policy parameters $\theta'$ with respect to the return parameters $\eta$ ($d\theta'/d\eta$ approximated as z') can be calculated iteratively, by adding to the previous gradient z (the gradient of the policy parameters θ with respect to the return parameters η), the differential of the update function (evaluated on the first set of experiences τ using the policy parameters θ and the return parameters η) with respect to the return parameters η(∂f (τ, θ, η)∂η).

The gradient of formula (3) may be defined using fixed meta-parameters η, or be adapted online. In order to make this adaptation, the parameter μ∈ [0,1] decays the trace and focuses on only recently made updates. For instance, choosing μ=0 results in a trace that considers only the immediate effects of the meta-parameters η on the policy parameters θ.

Then, the meta-parameters η 225 may be updated to updated meta-parameters to optimise the meta-objective function J' 260.

$$\Delta \eta = -\beta \frac{\partial J'(\tau', \theta', \eta')}{\partial \theta'} z' \quad (5)$$

Here, β is the learning rate for updating the meta-parameters η 225.

This update may be done for example by applying a stochastic gradient descent to update the meta-parameters η in the direction of the meta-gradient. Alternatively, the meta-objective function J' may be optimised by any other known gradient ascent or decent method.

The updated meta-parameters may then serve as the meta-parameters η 225 for the next iteration upon retrieval of the next plurality of experiences 250.

The following potential implementations consider the situation where the meta-parameters η 225 are used for prediction using a temporal-difference update, and the situation where the meta-parameters 225 are used for control, where this is achieved using a canonical actor-critic update function and a policy gradient meta-objective. The skilled reader will appreciate that many other alternative implementations using this meta-gradient approach to reinforcement learning would also be possible.

Figure 4:
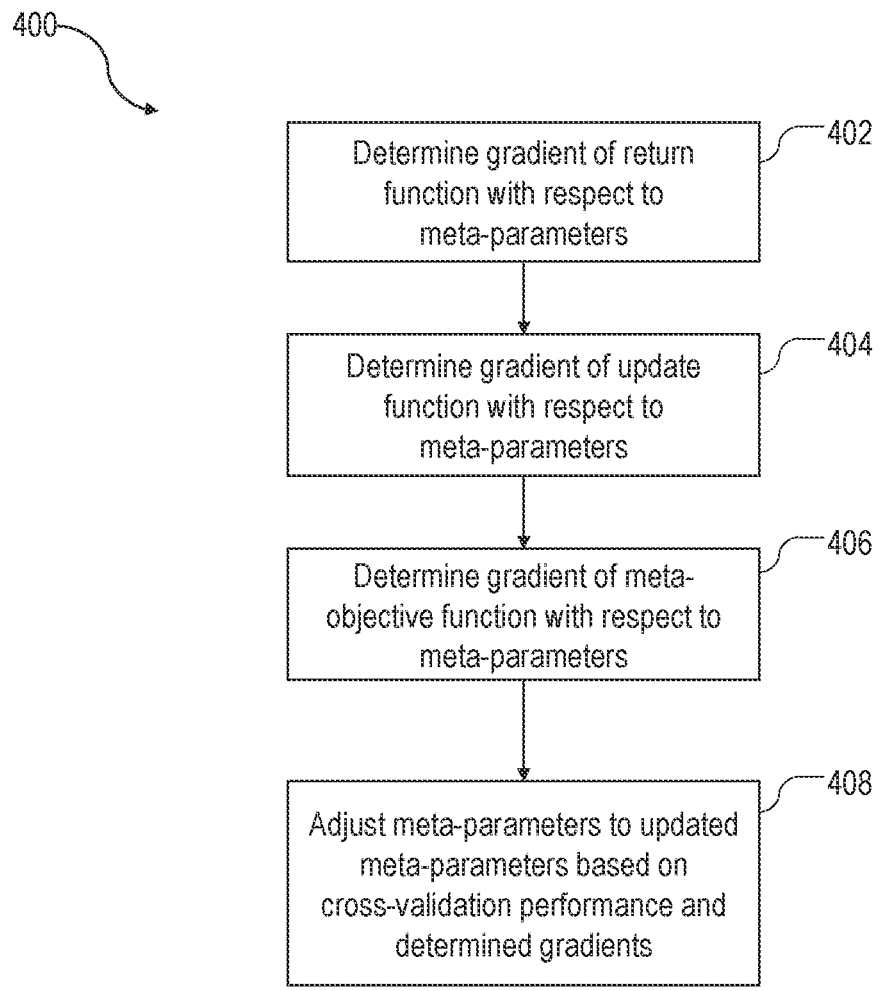
FIG. 4 shows the procedure for updating the meta-parameters subsequent to updating the policy parameters.

FIG. 4 illustrates the steps 400 in updating and applying the one or more meta-parameters η to the return function G. This procedure forms one implementation of step 308 shown previously in FIG. 3, after the policy parameters θ have been updated to updated policy parameters θ' and cross-validated.

In step 402, the gradient of the return function G 220 with respect to the one or more meta-parameters η 225 is determined.

In step 404, the gradient of the update function $f$ with respect to the one or more meta-parameters η 225 is determined.

In step 406, the gradient of the meta-objective function J' 260 with respect to the one or more meta-parameters η 225 is determined.

In addition to the steps shown in FIG. 4, and depending on the choice of meta-objective function J(τ, θ, η) chosen for the system 200, the gradient of the value function with respect to the policy parameters 215 (i.e., ∂v_θ(S)/∂θ) may also be calculated to determine the gradient of the update function $f$ with respect to the one or more meta-parameters η 225.

Therefore, the meta-gradient can be assessed for the one or more meta-parameters η 225, and the one or more meta-parameters η 225 can be adjusted accordingly in step 408 to ensure the optimum return function G, forming updated meta-parameters. These updated meta-parameters can then be used as the meta-parameters η 225 in the subsequent update iteration (where it is concluded that the optimum return function has not been reached).

In more detail, the return function $G_\eta$ (τ_t) 220 is defined as a function of an episode or a truncated n-step sequence of experience, i.e., τ_t={S_t, A_t, R_{t+1}, . . . , S_{t+n}}). As discussed earlier, the nature of the return function G, is determined by the one or more meta-parameters η.

The n-step return function $G_\eta$ 220 accumulates rewards over a sequence and then bootstraps from the value function, so that $$G_\eta(\tau_t) = R_{t+1} + \gamma R_{t+2} + \gamma^2 R_{t+3} + \gamma^{n-1} R_{t+n} + \gamma^n v_\theta(S_{t+n}) \quad (6)$$

where η={γ, n}.

The bootstrapping parameter λ return function, or λ-return, is a geometric mixture of n-steps, so the return function $G_\eta$ can be redefined as $$G_\eta(\tau_t) = R_{t+1} + \gamma(1-\lambda)v_\theta(S_{t+1}) + \gamma\lambda G_\eta(\tau_{t+1}) \quad (7)$$

where η={γ, λ}. The λ-return has the advantage of being fully differentiable with respect to both meta-parameters γ and λ 225.

In this case, the meta-parameters η chosen, γ and λ, may be considered to act as gates or conditions that cause the return to terminate (γ=0), bootstrap (λ=0), or to continue onto the next step (γ=1 or λ=1).

Conventionally, a typical reinforcement learning algorithm would hand-select the meta-parameters η, such as the discount factor γ and bootstrapping parameter λ, and these would be held fixed throughout training. However, in the reinforcement learning system described herein, the return function G is parameterized by meta-parameters η which may then be differentiated in order to understand the dependence of the return function G on η. This, in turn, allows the gradient of the update function $f$ with respect to the meta-parameters η, ∂f/∂η, to be determined, and therefore the meta-gradient of the meta-objective function J', ∂J'(τ', θ', η')/∂η can also be determined. This allows for the system to assess which return function G 220 results in the optimal performance, and adjust the meta-parameters η 225 accordingly according to formulas (2) to (5).

In a particular implementation of the system 200, the canonical TD(λ) algorithm for prediction may be used for making a prediction about the optimum return function based on the meta-parameters η 225 chosen. The objective of the TD(λ) algorithm is to minimise the squared error between the value function approximator v_θ (S) and the λ-return $G_\eta(\tau)$, $$J(\tau, \theta, \eta) = (G_\eta(\tau) - v_\theta(S))^2 \frac{\partial J(\tau, \theta, \eta)}{\partial \theta} = -2(G_\eta(\tau) - v_\theta(S))\frac{\partial v_\theta(S)}{\partial \theta} \quad (8)$$

Here, τ is the first set of experiences starting with a starting state S, and ∂J(τ, θ, η)/∂θ is a semi-gradient. For instance the λ-return is treated as a constant.

The TD(λ) update function $f$ (τ, θ, η) applies stochastic gradient descent to update the agent's policy parameters θ 215 to descend the gradient of the objective with respect to the policy parameters θ 215, so that $$f(\tau, \theta, \eta) = -\frac{\alpha}{2}\frac{\partial J(\tau, \theta, \eta)}{\partial \theta} = \alpha(G_\eta(\tau) - v_\theta(S))\frac{\partial v_\theta(S)}{\partial \theta} \quad (9)$$

Here, α is the learning rate for updating the policy parameters θ. The update function $f$ here is differentiable with respect to the meta-parameters η 225, so that $$\frac{\partial f(\tau, \theta, \eta)}{\partial \eta} = -\frac{\alpha}{2} \frac{\partial^2 J(\tau, \theta, \eta)}{\partial \theta \, \partial \eta} = \alpha \frac{\partial G_\eta(\tau)}{\partial \eta} \frac{\partial v_\theta(S)}{\partial \theta} \quad (10)$$

The aim of the meta-gradient prediction in this implementation is to adjust the meta-parameters η 225 in the direction that achieves the best predictive accuracy. This is measured during the step described earlier and shown in step 306 of FIG. 3 where the updated policy parameters θ' are cross-validated based on a second set of experiences τ' that starts from a state S', using a mean squared error (MSE) meta-objective function J' and taking its semi-gradient, in the form $$J'(\tau', \theta', \eta') = (G_\eta(\tau') - v_{\theta'}(S'))^2 \quad (11)$$

$$\frac{\partial J'(\tau', \theta', \eta')}{\partial \theta'} = -2(G_{\eta'}(\tau') - v_{\theta'}(S')) \frac{\partial v_{\theta'}(S')}{\partial \theta'}$$

Therefore, the meta-gradient of the meta-objective function ∂J'(τ', θ', η')/∂η can be determined and implemented in conjunction with formulas (2) to (5) to arrive at the necessary updates for the meta-parameters η.

The meta-objective function J' in this implementation can use an unbiased and long sighted return function G 220, for example using η'={γ', λ'}, where γ'=1 and λ'=1.

In a further implementation of the system 200, the meta-gradients may be applied to control, such as an A2C actor-critic algorithm. In this implementation, the actor-critic update function combines both prediction and control into a single update to the policy.

The semi-gradient of the A2C meta-objective function is defined as:

$$-\frac{\partial J(\tau, \theta, \eta)}{\partial \theta} = (G_\eta(\tau) - v_\theta(S)) \frac{\partial \log \pi_\theta(A \mid S)}{\partial \theta} + \quad (12)$$
$$c(G_\eta(\tau) - v_\theta(S)) \frac{\partial v_\theta(S)}{\partial \theta} + d \frac{\partial H(\pi_\theta(. \mid S))}{\partial \theta}$$

In this formula, the first term represent a control objective that configures the policy $\pi_\theta$ 210 to maximise the measured reward of the return function 220. The second term represents a prediction objective that configures the value function approximator $v_\theta$ to accurately estimate the return of the return function $G_\eta(\tau)$. The third term is a term for entropy H that regularizes the policy 210, and c and d are coefficients that appropriately weight the different terms in the meta-objective function.

The A2C update function $f(\tau, \theta, \eta)$ applies stochastic gradient descent to update the policy parameters θ 215. This update function is differentiable with respect to the meta-parameters η 225, so that $$f(\tau, \theta, \eta) = -\alpha \frac{\partial J(\tau, \theta, \eta)}{\partial \theta} \quad (13)$$

$$\frac{\partial f(\tau, \theta, \eta)}{\partial \eta} = \alpha \frac{\partial G_\eta(\tau)}{\partial \eta} \left[ \frac{\partial \log \pi_\theta(A \mid S)}{\partial \theta} + c \frac{\partial v_\theta(S)}{\partial \theta} \right]$$

Here, α is a learning rate applied when updating the one or more policy parameters from one or more previous policy parameters.

The choice of meta-objective function 260 in this implementation is one that serves to ensure that the return function maximises the performance of the agent. This may be achieved using a policy-gradient objective of the form $$\frac{\partial J'(\tau', \theta', \eta')}{\partial \theta'} = (G_{\eta'}(\tau') - v_{\theta'}(S')) \frac{\partial \log \pi_{\theta'}(A' \mid S')}{\partial \theta'} \quad (14)$$

Here, $G_{\eta'}$ is a further return function that evaluates the updated policy in terms of the returns from the further return function when applied to the second set of experiences τ', $v_{\theta'}(S')$ is the value function associated with the updated policy for the state S', and $\pi_{\theta'}(A'|S')$ is the updated policy for action A' in response to state S'.

Therefore, this formula assesses the success of the updated policy parameters θ' in view of the returns computed under η' using the second set of experiences τ'.

When the updated policy parameters θ' are assessed by cross-validation using the meta-objective function in this implementation, fixed meta-parameters η' may be used that represent a good approximation of the true objective of the agent. This may comprise selecting reasonable values of η' based on values that perform well in practice.

The meta-gradient learning algorithm under this implementation can then be implemented in the following manner. First, the policy parameters θ 215 are updated based on the first set of experiences τ using the A2C update function shown in formula (12). This and the gradient of the update function ∂f(τ, θ, η)/∂η shown in formula (13) are accumulated into a trace z such as that shown earlier in formula (4). Then, the performance is cross-validated on the second set of experiences τ' using the policy gradient meta-objective ∂J'(τ', θ', η')/∂η shown in formula (14). Finally, the meta-parameters η 225 can then be updated according to the gradient of the meta-objective function 260 according to formulas (2) to (5).

One aspect of the implementation described above is that the return function $G_\eta(\tau)$ 220 is non-stationary, in that this updates throughout the training process along with the meta-parameters η 225. This may lead to the value function $v_\theta$ becoming inaccurate, since it may be approximating out of date returns.

For instance, the value function $v_\theta$ may initially form a good approximation at the start of the training process where γ=0, but then form a poorer approximation later in the training process after γ has been adapted to γ=1

This likewise applies to the policy π 220, which also may be formed based on out of date returns.

Therefore, in order to address this non-stationary aspect of the value function $v_\theta$ and the policy π 220, a method similar to the universal value function approximation (UVFA) may be implemented. Here, the meta-parameters η are provided as an additional input to condition the value function $v_\theta$ and the policy π 220, in the form $$v_\theta^\eta(S) = v_\theta([S; e_\eta]) \quad \pi_\theta^\eta(S) = \pi_\theta([S; e_\eta]) \quad e_\eta = W_\eta \eta$$

Where $e_\eta$ is the embedding of η, [s; $e_\eta$] is the concatenation of vectors s and $e_\eta$, and $W_\eta$ is the embedding matrix (or a row vector, for a scalar 7) that is updated by backpropagation during training.

In this implementation, the agent then explicitly learns the value function $v_\theta$ and the policy π 220 most appropriate for any given value of the meta-parameters η 225. This has the advantage of allowing the meta-parameters η to be adjusted without any need to wait for the approximator to "catch up".

The approaches and various implementations of the system 200 described thus far can be scaled up. For instance, to improve efficiency the A2C objective and meta-objective function may be accumulated over all time-steps within an n-step set of experiences. The A2C objective function may be optimised by RMSProp without momentum. This results in a differentiable function of meta-parameters η 225, and can therefore be substituted similarly to stochastic gradient descent (see formula 13). As in IMPALA, an off-policy correction may be used, based on a V-trace return. For further efficient implementation, mini-sets of experiences may be computed in parallel, or sets of experiences may be reused twice for both the update function and for cross-validation. For instance, in order to reduce the data needed for meta learning, the experiences can be used for both agent training and meta learning. For example, experiences τ can be used for updating θ into θ' and the performance of this update can be validated via evaluating J' on experiences τ'. Vice versa, the roles of τ and τ' can be swapped so that experiences τ' can be used for updating θ into θ', and the performance of this update can be validated via evaluating J' on experiences τ. In this way, the proposed method does not require extra data other than the data used to train the agent parameter θ to conduct the meta learning update to η.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A reinforcement learning system comprising one or more computers configured to:

retrieve training data comprising a plurality of experiences generated as a result of an agent interacting with an environment to perform a task in an attempt to achieve a specified result, each experience comprising an observation characterizing a state of the environment, an action performed by the agent in response to the observation and a reward received in response to the action; and train a reinforcement learning neural network having one or more policy parameters to control the agent to perform the task by jointly training (i) the reinforcement learning neural network and (ii) an objective function that has one or more objective function parameters and that evaluates performance of the agent based on the actions performed by the agent, comprising:

updating the one or more policy parameters for the reinforcement learning neural network based on a first set of the experiences using the objective function;

updating the one or more objective function parameters of the objective function based on the one or more updated policy parameters and a second set of the experiences, wherein the one or more objective function parameters are updated via a gradient ascent or descent method using a meta-objective function differentiated with respect to the one or more objective function parameters, wherein the meta-objective function is dependent on the one or more policy parameters;

retrieving updated experiences generated as a result of the agent interacting with the environment to perform the task under the control of the reinforcement neural network using the one or more updated policy parameters and the one or more updated objective function parameters;

further updating the one or more policy parameters based on a first set of the updated experiences using the one or more updated objective function parameters; and further updating the one or more objective function parameters based on the further updated policy parameters and a second set of the updated experiences via the gradient ascent or descent method.

2. The reinforcement learning system of claim 1, wherein updating the one or more objective function parameters utilizes a differential of the one or more updated policy parameters with respect to the one or more objective function parameters.

3. The reinforcement learning system of claim 1, wherein updating the one or more objective function parameters comprises applying a further objective function as part of the meta-objective function and evaluating the updated policy from the further objective function when applied to the second set of updated experiences.

4. The reinforcement learning system of claim 1, wherein the updating of the one or more policy parameters applies one or more of a policy and a value function that are conditioned on the one or more objective function parameters.

5. The reinforcement learning system of claim 4, wherein the conditioning is via an embedding of the one or more objective function parameters.

6. The reinforcement learning system of claim 1, wherein the one or more objective function parameters comprise one or more of a discount factor of the objective function and a bootstrapping factor of the objective function.

7. The reinforcement learning system of claim 1, wherein the one or more computers are further configured to:
  update the one or more policy parameters for the reinforcement learning neural network based on the second set of the experiences; and
  update the one or more objective function parameters of the objective function based on the one or more updated policy parameters and the first set of the experiences, wherein the one or more objective function parameters are updated via the gradient ascent or descent method.

8. The reinforcement learning system of claim 1, wherein the differentiated meta-objective function is:

$$\frac{\delta J'(\tau', \theta', \eta')}{\partial \eta} = \frac{\partial J'(\tau', \theta', \eta')}{\partial \theta'} \frac{d\theta'}{d\eta}$$

where:
  $\eta$ are the one or more objective function parameters; and
  $J'(\tau', \theta', \eta')$ is the meta-objective function conditioned on the second set of experiences $\tau'$, the one or more updated policy parameters $\theta'$ and one or more further objective function parameters $\eta'$ of a further objective function forming part of the meta-objective function.

9. The reinforcement learning system of claim 8, wherein the reinforcement learning system is configured to calculate the differentiated meta-objective function based on a differential of the updated policy parameters $\theta'$ with respect to the one or more objective function parameters $\eta$, $d\theta'/d\eta$, calculated by adding a differential of an update function with respect to the one or more objective function parameters, $df(\tau, \theta, \eta)/d\eta$, the update function being for updating the policy, to a differential of the policy parameters $\theta$ with respect to the objective function parameters $\eta$, $d\theta/d\eta$.

10. The reinforcement learning system of claim 9 wherein the differential of the update function with respect to the objective function parameters, $\partial f(\eta, \theta, \eta)/\partial \eta$, is calculated via:

$$\frac{\partial f(\tau, \theta, \eta)}{\partial \eta} = \alpha \frac{\partial G_\eta(\tau)}{\partial \eta} \left[ \frac{\partial \log \pi_\theta(A|S)}{\partial \theta} + c \frac{\partial v_\theta(S)}{\partial \theta} \right]$$

where:
  $\alpha$ is a learning rate applied when updating the one or more policy parameters from one or more previous policy parameters;
  $G_\eta(\tau)$ is the objective function that evaluates performance of the agent from the first set of experiences $\tau$ based on the one or more objective function parameters $\eta$;
  $\pi_\theta$ is the policy for the reinforcement learning neural network for determining actions A from states S, the policy $\pi_\theta$ operating according to the one or more policy parameters $\theta$;
  c is a coefficient; and
  $v_\theta(S')$ is a value function that determines values for states S' based on the one or more policy parameters $\theta$.

11. The reinforcement learning system of claim 8, wherein:

$$\frac{\partial J'(\tau', \theta', \eta')}{\partial \theta'} = (G_{\eta'}(\tau') - v_{\theta'}(S')) \frac{\partial \log \pi_{\theta'}(A'|S')}{\partial \theta'}$$

where:
  $G_{\eta'}(\tau')$ is the further objective function that evaluates performance of the agent from the second set of experiences $\tau'$ based on the one or more further objective function parameters $\eta'$;
  $\pi_{\theta'}$ is the policy for the reinforcement learning neural network for determining actions A' from states S' taken from the second set of experiences $\tau'$, the policy $\pi_{\theta'}$ operating according to the one or more updated policy parameters $\theta'$; and
  $v_{\theta'}(S')$ is a value function that determines values for states S' based on the one or more updated policy parameters $\theta'$.

12. The reinforcement learning system of claim 8, wherein the one or more further objective function parameters are kept fixed.

13. The reinforcement learning system of claim 8, wherein updating the one or more objective function parameters comprises calculating:

$$\eta' = \eta - \beta \frac{\partial J'(\tau', \theta', \eta')}{\partial \eta}$$

where
  $\eta'$ are the one or more updated objective function parameters; and
  $\beta$ is a learning factor for updating the one or more objective function parameters.

14. A computer-implemented method for reinforcement learning, the method comprising:
  retrieving training data comprising a plurality of experiences generated as a result of an agent interacting with an environment to perform a task in an attempt to achieve a specified result, each experience comprising an observation characterizing a state of the environment, an action performed by the agent in response to the observation and a reward received in response to the action; and
  training a reinforcement learning neural network having a plurality of policy parameters to control the agent to perform the task by jointly training (i) the reinforcement learning neural network and (ii) an objective function that has one or more objective function parameters and that evaluates performance of the agent based on the actions performed by the agent, comprising:
    updating the one or more policy parameters for the reinforcement learning neural network based on a first set of the experiences using the objective function;

updating the one or more objective function parameters of the objective function based on the one or more updated policy parameters and a second set of the experiences, wherein the one or more objective function parameters are updated via a gradient ascent or descent method using a meta-objective function differentiated with respect to the one or more objective function parameters, wherein the meta-objective function is dependent on the one or more policy parameters;

retrieving updated experiences generated as a result of the agent interacting with the environment to perform the task under the control of the reinforcement neural network using the one or more updated policy parameters and the one or more updated objective function parameters;

further updating the one or more policy parameters based on a first set of the updated experiences using the one or more updated objective function parameters; and further updating the one or more objective function parameters based on the further updated policy parameters and a second set of the updated experiences via the gradient ascent or descent method.

15. The method of claim 14 wherein updating the one or more objective function parameters utilizes a differential of the one or more updated policy parameters with respect to the one or more objective function parameters.

16. The method of claim 14, wherein updating the one or more objective function parameters comprises applying a further objective function as part of the meta-objective function and evaluating the updated policy from the further objective function when applied to the second set of experiences.

17. The method of claim 14, wherein the updating of the one or more policy parameters applies one or more of a policy and a value function that are conditioned on the one or more objective function parameters.

18. The method of claim 17, wherein the conditioning is via an embedding of the one or more objective function parameters.

19. The method of claim 14, further comprising:

updating the one or more policy parameters for the reinforcement learning neural network based on the second set of the experiences; and updating the one or more objective function parameters of the objective function based on the one or more updated policy parameters and the first set of the experiences, wherein the one or more objective function parameters are updated via the gradient ascent or descent method.

20. One or more non-transitory computer-readable storage media storing instructions that when executed by one or more computers cause the one or more computers to perform operations comprising:

retrieving training data comprising a plurality of experiences generated as a result of an agent interacting with an environment to perform a task in an attempt to achieve a specified result, each experience comprising an observation characterizing a state of the environment, an action performed by the agent in response to the observation and a reward received in response to the action; and training a reinforcement learning neural network having a plurality of policy parameters to control the agent to perform the task by jointly training (i) the reinforcement learning neural network and (ii) an objective function that has one or more objective function parameters and that evaluates performance of the agent based on the actions performed by the agent, comprising:

updating the one or more policy parameters for the reinforcement learning neural network based on a first set of the experiences using the objective function;

updating the one or more objective function parameters of the objective function based on the one or more updated policy parameters and a second set of the experiences, wherein the one or more objective function parameters are updated via a gradient ascent or descent method using a meta-objective function differentiated with respect to the one or more objective function parameters, wherein the meta-objective function is dependent on the one or more policy parameters;

retrieving updated experiences generated as a result of the agent interacting with the environment to perform the task under the control of the reinforcement neural network using the one or more updated policy parameters and the one or more updated objective function parameters;

further updating the one or more policy parameters based on a first set of the updated experiences using the one or more updated objective function parameters; and further updating the one or more objective function parameters based on the further updated policy parameters and a second set of the updated experiences via the gradient ascent or descent method.

* * * * *